(12) United States Patent
Cruz

(10) Patent No.: US 8,946,352 B2
(45) Date of Patent: Feb. 3, 2015

(54) MELT PROCESSABLE POLY (VINYL ALCOHOL) BLENDS AND POLY (VINYL ALCOHOL) BASED MEMBRANES

(75) Inventor: Carlos A. Cruz, Holland, PA (US)

(73) Assignee: Empire Technology Development LLC, Wilmington, DE (US)

( * ) Notice: Subject to any disclaimer, the term of this patent is extended or adjusted under 35 U.S.C. 154(b) by 349 days.

(21) Appl. No.: 13/128,207

(22) PCT Filed: Dec. 16, 2010

(86) PCT No.: PCT/US2010/060879
§ 371 (c)(1),
(2), (4) Date: May 6, 2011

(87) PCT Pub. No.: WO2012/082131
PCT Pub. Date: Jun. 21, 2012

(65) Prior Publication Data
US 2012/0153544 A1    Jun. 21, 2012

(51) Int. Cl.
| | | |
|---|---|---|
| C08L 29/04 | (2006.01) | |
| C08J 9/26 | (2006.01) | |
| B01D 67/00 | (2006.01) | |
| B01D 71/26 | (2006.01) | |
| B01D 71/34 | (2006.01) | |
| B01D 71/38 | (2006.01) | |
| B01D 71/40 | (2006.01) | |
| B01D 71/48 | (2006.01) | |
| C08J 9/00 | (2006.01) | |
| C08L 77/00 | (2006.01) | |

(52) U.S. Cl.
CPC .............. *C08J 9/26* (2013.01); *B01D 67/0006* (2013.01); *B01D 67/002* (2013.01); *B01D 67/003* (2013.01); *B01D 67/0093* (2013.01); *B01D 71/26* (2013.01); *B01D 71/34* (2013.01); *B01D 71/38* (2013.01); *B01D 71/40* (2013.01); *B01D 71/48* (2013.01); *C08J 9/0061* (2013.01); *C08L 29/04* (2013.01); *B01D 2323/30* (2013.01); *B01D 2323/34* (2013.01); *B01D 2323/42* (2013.01); *B01D 2323/50* (2013.01); *C08J 2201/03* (2013.01); *C08J 2201/0464* (2013.01); *C08J 2333/10* (2013.01); *C08J 2351/00* (2013.01); *C08J 2429/04* (2013.01); *C08L 77/00* (2013.01)
USPC ................................ 525/57; 523/201; 525/58

(58) Field of Classification Search
USPC ........................ 525/57, 58; 523/201
See application file for complete search history.

(56) References Cited

U.S. PATENT DOCUMENTS

| 4,073,733 | A | | 2/1978 | Yamauchi et al. | |
|---|---|---|---|---|---|
| 4,267,145 | A | | 5/1981 | Wysong | |
| 4,464,438 | A | * | 8/1984 | Lu | 428/516 |
| 4,600,746 | A | | 7/1986 | Schmukler et al. | |
| 4,963,304 | A | | 10/1990 | Im et al. | |
| 5,206,278 | A | | 4/1993 | Famili et al. | |
| 5,288,403 | A | | 2/1994 | Ohno | |
| 5,349,000 | A | | 9/1994 | Robeson et al. | |
| 5,362,778 | A | | 11/1994 | Famili et al. | |
| 5,567,768 | A | | 10/1996 | Amici et al. | |
| 5,605,960 | A | | 2/1997 | Brady et al. | |
| 5,773,028 | A | * | 6/1998 | Inagi et al. | 424/487 |
| 6,087,442 | A | | 7/2000 | LaFleur et al. | |
| 6,558,546 | B2 | | 5/2003 | Allcock et al. | |
| 6,767,961 | B1 | * | 7/2004 | Wang et al. | 525/58 |
| 7,012,116 | B1 | | 3/2006 | Schertz et al. | |

FOREIGN PATENT DOCUMENTS

EP           0302650  A1     2/1989

OTHER PUBLICATIONS

Radusch, H.J., Micro- and nanostructured multiphase polymer blend systems, Eds. C. Harrats, S. Thomas and G. Groeninckx, Ch. 9, 2006, CRC Press.

Australian Patent Office, International Search Report and Written Opinion of the International Searching Authority for PCT/US2010/060879, Jan. 31, 2011, Australia.

Nishino et al., Melt processing of poly(vinyl alcohol) through blending with sugar pendant polymer, Polymer, 2002, vol. 43, Issue 9, pp. 2869-2873.

Zhang, Yuzhong, et al., Preparation and characterization of modified polyvinyl alcohol ultrafiltration membranes, Desalination, 192 (2006), pp. 214-223.

Yoon, Kyunghwan, et al., High flux ultrafiltration nanofibrous membranes based on polyacrylonitrile electrospun scaffolds and crosslinked polyvinyl alcohol coating, Journal of Membrane Science 338(2009), pp. 145-152.

Wang, Chan-chan, et al., Hydrophilic and antibacterial properties of polyvinyl alcohol/4-vinylpyridine graft polymer modified polypropylene non-woven fabric membranes, Journal of Membrane Science 345 (2009), pp. 223-232.

Sanderson, R.D., et al., Polyvinyl alcohol and modified polyvinyl alcohol reverse osmosis membranes, Desalination, 90 (1993), pp. 15-29, Elsevier Science Publishers B.V., Amsterdam.

Chandavasu, C., et al., Preparation of microporous film from immiscible blends via melt processing, Journal of Plastic Film and Sheeting, Oct. 2000, vol. 16, No. 4, pp. 288-300, SAGE Publications, USA.

(Continued)

*Primary Examiner* — Fred M Teskin
*Assistant Examiner* — Marie Reddick
(74) *Attorney, Agent, or Firm* — Turk IP Law, LLC

(57) ABSTRACT

Technologies and implementations for providing melt processable poly(vinyl alcohol) blends and poly(vinyl alcohol) based membranes are generally disclosed.

8 Claims, 6 Drawing Sheets

(56) References Cited

OTHER PUBLICATIONS

Schmedlen, Rachael H., et al., Photocrosslinkable polyvinyl alcohol hydrogels that can be modified with cell adhesion peptides for use in tissue engineering, Biomaterials, 23 (2002), pp. 4325-4332, Elsevier Science Ltd.

Chen, N., et al., New technology for thermal processing of poly(vinyl alcohol), Plastics, Rubber and Composites, vol. 36, Nos. 7-8, Oct. 2007, pp. 283-290, Maney Publishing.

Ku, Te-Hsing, et al., Rheological properties of thermoplastic polyvinyl alcohol and polypropylene blend melts in capillary extrusions, Journal of Polymer Research, vol. 12, pp. 23-29, 2005, SpringerLink.

Lin, Chin-An, et al., Hollow porous polypropylene fibers with polyvinyl alcohol by melt spinning, published online Aug. 15, 2007, Feng Chia University, accessed on May 3, 2011 on http://dspace.lib.fcu.edu.tw/bitstream/2377/3879/1/ce05atc902007000008.pdf.

Inoguchi, Y., et al, Polyvinyl Alcohols, CEH Report, Polyvinyl Alcohol, SRI Consulting, published Sep. 2010.

Restriction Requirement mailed Oct. 25, 2012, in U.S. Appl. No. 13/128,207, Carlos A. Cruz, filed May 6, 2011.

Non Final Office Action mailed Jan. 25, 2013, in U.S. Appl. No. 13/128,207, Carlos A. Cruz, filed May 6, 2011.

Notice of Allowance mailed Jun. 27, 2013, in U.S. Appl. No. 13/128,207, Carlos A. Cruz, filed May 6, 2011.

Chandavasu, C., et al., "Preparation of Microporous Films from Immiscible Blends via Melt Processing," SPE ANTEC, vol. 1, p. 1, May 7-11, 2000. http://www.4plasticsresearch.com/abstract.php?id=2000-0538.pdf&type=hitlist&num=2.

* cited by examiner

Poly(Vinyl Alcohol) (PVOH)

2-Glucosyloxyethyl Methacrylate (GEMA)

700 A computer program product

702 A signal bearing medium 704 at least one of blending a first polymer including poly(vinyl alcohol), a second polymer including 2-glucosyloxyethyl methacrylate and a third polymer configured to provide post-melt processing flexibility to the polymer blend to form a melt processable polymer blend;

extruding the melt processable polymer blend;

forming a membrane from the extruded melt processable polymer blend;

dissolving at least a portion of the first polymer to form the purification membrane;

cross-linking at least a portion of the first polymer to form the purification membrane; or treating the purification membrane to produce a photoactive membrane, wherein said treating includes application of at least one of aminobutyraldehyde diethyl acetal or methacrylamidoacetaldehyde dimethyl acetal.

| 706 a computer-readable medium | 708 a recordable medium | 710 a communications medium |

Fig. 7

MELT PROCESSABLE POLY (VINYL ALCOHOL) BLENDS AND POLY (VINYL ALCOHOL) BASED MEMBRANES

CROSS-REFERENCE TO RELATED APPLICATIONS

This Application is the National Stage filing under 35 U.S.C. §371 of PCT Application Ser. No. PCT/US2010/060879 filed on Dec. 16, 2010. The disclosure of the PCT Application is hereby incorporated by reference in its entirety.

BACKGROUND

Unless otherwise indicated herein, the approaches described in this section are not prior art to the claims in this application and are not admitted to be prior art by inclusion in this section.

Membranes based on poly(vinyl alcohol) (PVOH) may have many desirable characteristics, including excellent water permeation, and may have several useful applications. However, PVOH polymers may degrade under standard processing conditions and may have overall poor melt processing characteristics, which may make membranes based on PVOH difficult to produce.

SUMMARY

In accordance with some implementations, melt-processable polymer blends may include a polymer including poly (vinyl alcohol), a polymer including 2-glucosyloxyethyl methacrylate, and a polymer configured to provide post melt processing flexibility to the polymer blend.

In accordance with some implementations, methods for producing purification membranes may include blending a polymer including poly(vinyl alcohol), a polymer including 2-glucosyloxyethyl methacrylate and a polymer configured to provide post melt processing flexibility to the polymer blend to form a melt processable polymer blend, extruding the melt processable polymer blend, forming a membrane from the extruded melt processable polymer blend, and dissolving a portion of the polymer including poly(vinyl alcohol) to form the purification membrane.

In accordance with some implementations, methods for producing purification membranes may include blending a polymer including poly(vinyl alcohol), a polymer including 2-glucosyloxyethyl methacrylate and a polymer configured to provide post melt processing flexibility to the polymer blend to form a melt processable polymer blend, extruding the melt processable polymer blend, forming a membrane from the extruded melt processable polymer blend, and crosslinking a portion of the polymer including poly(vinyl alcohol) to form the purification membrane.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 is an illustration of an example computer program product; and

DETAILED DESCRIPTION

Figure 1:
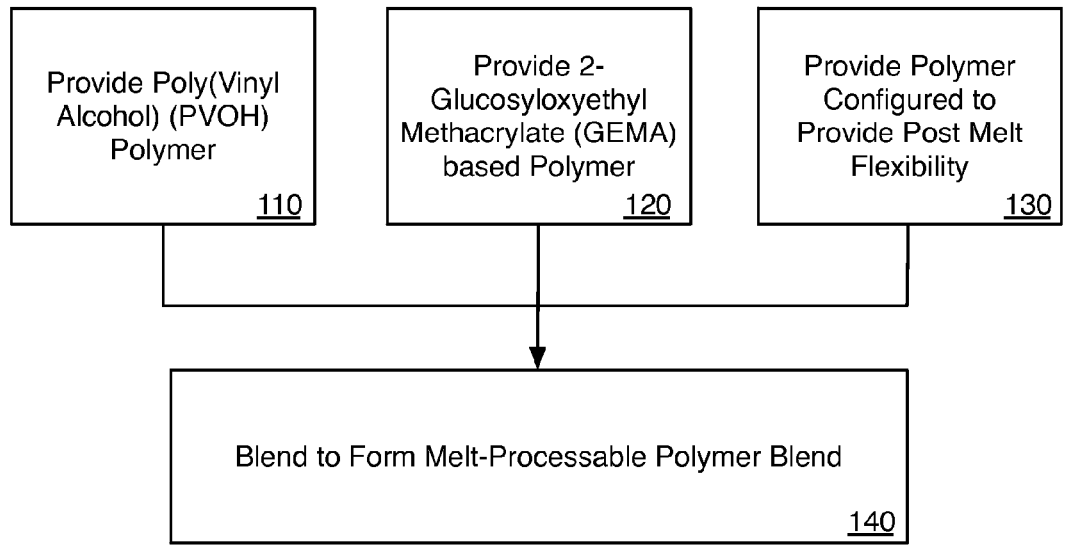
FIG. 1 is an illustration of a flow chart of an example method for producing a melt-processable polymer blend.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, systems and computer readable media related to melt processable poly(vinyl alcohol) blends and membranes based on poly(vinyl alcohol).

Membranes based on poly(vinyl alcohol) (PVOH) may have desirable characteristics including water permeation. Such membranes may be suitable for a variety of applications including, for example, water treatment applications. It may be desirable to form such membranes using a polymer blend that may perform well with melt processing techniques such as, for example, extrusion, injection molding, casting, or the like.

In some examples, a blend including PVOH may be provided that may be melt processable, such that the polymer blend may be used in melt polymer processing techniques. In some examples, the polymer blend may include PVOH, 2-glucosyloxyethyl methacrylate (GEMA) and a polymer that may be configured to provide post melt processing flexibility to the polymer blend. In some examples, the polymer that provides flexibility may be included because a blend containing only PVOH and GEMA may be too rigid for polymer processing and/or various uses or applications of the processed polymer. In various examples, the flexibility providing polymer may be one or more of a poly(vinylidene fluoride) polymer, a polyolefin polymer, a rubber, a thermoplastic elastomer, a polyethylene polymer, a polypropylene polymer, a nylon or a polyester.

In some examples, PVOH, 2-glucosyloxyethyl methacrylate (GEMA) and a polymer that may be configured to provide post melt processing flexibility to the polymer blend may be blended. In an example, the polymers may be dry blended to form a melt processable polymer blend. The polymer blend may be extruded, and a membrane may be formed from the extruded melt processable polymer blend.

In some examples, at least a portion of the PVOH may be dissolved from the membrane to form a microporous membrane. The microporous membrane may include channels with substantially small diameters such that the microporous membrane may provide a filter to larger particles or particulate. Such microporous membranes may be used in, for example, water purification applications.

In other examples, the membrane formed from the extruded melt processable polymer blend may go through a crosslinking of the PVOH (the crosslinking may be post-treatment or it may be in situ during membrane formation). The crosslinking may substantially set and immobilize the polymers such that the crosslinked membrane may be water resistant and yet retain its substantially high degree of water permeability and swelling ability.

In some examples, in the membranes discussed herein, by manipulating the chemistry of the PVOH in the pre- or post-melt processing phase, smart materials or smart membranes may be formed. A smart material or membrane may have a property that may be controllably changed by, for example, external stress, temperature, pH, electrical conditions or magnetic conditions.

FIG. 1 is an illustration of a flow chart of an example method 100 for producing a melt-processable polymer blend arranged in accordance with at least some embodiments of the present disclosure. Method 100 may include one or more functions, operations or actions as illustrated by one or more of blocks 110, 120, 130 and/or 140. In some examples, method 100 may be implemented under the control of a computer system, as is discussed further herein. Processing for method 100 may begin at blocks 110, 120 and/or 130.

Figure 2:
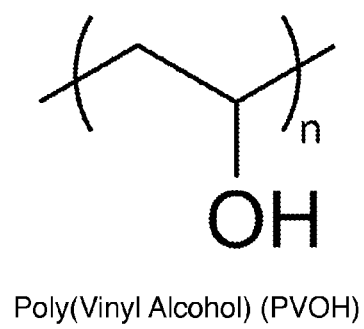
FIG. 2 is an illustration of an example structure of poly (vinyl alcohol)

At block 110, "Provide Poly(Vinyl Alcohol) (PVOH) Polymer", a PVOH based polymer may be provided or obtained. In some examples, the PVOH polymer may be commercially obtained. In some examples, the PVOH polymer may be produced by partial or complete hydrolysis of polyvinyl acetate to remove acetate groups. In general, the PVOH polymer may have the structure shown in FIG. 2. The PVOH polymer may have any suitable length of polymer chain, any suitable molecular weight or any suitable degree of hydrolysis for the application for which the blend is being produced.

Figure 3:
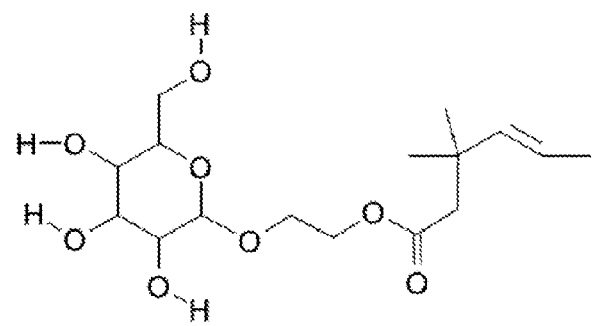
FIG. 3 is an illustration of an example structure of 2-glucosyloxyethyl methacrylate.

At block 120, "Provide 2-Glucosyloxyethyl Methacrylate (GEMA) based Polymer", a GEMA based polymer may be provided or obtained. In general, the GEMA based polymer may include 2-glucosyloxyethyl methacrylate (GEMA) incorporated as a comonomer in a polymer material. In general. GEMA may have the structure illustrated in FIG. 3. As shown in FIG. 3, GEMA may include a methacrylate backbone and sugar residues in its side chains. In some examples, the GEMA based polymer may be commercially obtained. In some examples, the GEMA based polymer may be produced by direct coupling of 2-hydroxyethyl methacrylate with an aldose such as, but not limited to, glucose, galactose, mannose, and/or xylose. In some examples, the GEMA may be incorporated in a linear acrylic polymer. In some examples, the linear acrylic polymer with incorporated GEMA may be produced in solution, in bulk, or by emulsion polymerization. In other examples, the GEMA may be incorporated in a core-shell type acrylic. In some examples, the core-shell type acrylic with incorporated GEMA may be produced by an emulsion polymerization process. In general, the GEMA based polymer may serve as a plasticizer and/or thermal stabilizer for the PVOH polymer, and may provide substantially thermoplastic characteristics to the post melt blend. In some examples, the GEMA based polymer may promote homogeneous fusion in the polymer blend. In general, any amount of GEMA based polymer may be used in the blend based on the application for which the blend is being produced. In some examples, a relatively small amount of GEMA based polymer may be used to achieve the desired characteristics in the blend.

At block 130, "Provide Polymer Configured to Provide Post Melt Flexibility", a polymer configured to provide post melt flexibility may be provided or obtained. In general, the polymer configured to provide post melt flexibility may be chosen such that it is substantially pliable and may add post melt flexibility to an otherwise post melt rigid blend of a PVOH polymer and a GEMA based polymer. In some examples, the polymer configured to provide post melt flexibility may include one or more of a poly(vinylidene fluoride) polymer, a polyolefin polymer, a rubber, a thermoplastic elastomer, a polyethylene polymer, a polypropylene polymer, a nylon or a polyester. In some examples, the polymer configured to provide post melt flexibility may be commercially obtained. In other examples, the polymer configured to provide post melt flexibility may be produced. Processing may continue at block 140.

At block 140, "Blend to Form Melt-Processable Polymer Blend", the PVOH polymer, the GEMA based polymer and the polymer configured to provide post melt flexibility may be blended. The blending may be performed according to any suitable polymer processing techniques that may substantially blend the polymers. In some examples, the blend may be performed as a dry blend of the chosen polymers. In some examples, the blend may be formed by dissolving the chosen polymers in a solvent and evaporating the solvent. In some examples, the blend may be formed by heating the chosen polymers and blending them in an amorphous phase. In some examples, forming the blend may include the addition of a plasticizer that may facilitate the blending of the chosen polymers. In some examples, the discussed blends may be commercially provided.

As discussed, a PVOH polymer, a GEMA based polymer and a polymer configured to provide post melt flexibility may be blended to form a melt processable polymer blend. In some examples, the polymers and polymer proportions may be chosen such that the resultant melt processable blend may produce membranes and other shapes efficiently using melt polymer processing techniques. In some examples, the PVOH polymer and the GEMA based polymer may be considered a first polymer blend. In such examples, the polymers and fractions of polymers used in the blends may be chosen such that the ratio of the melt viscosity of the first polymer blend to the melt viscosity of the polymer configured to provide post melt flexibility may be about the same as the ratio of the volume fraction of the first polymer blend to the volume fraction of the polymer configured to provide post melt. Such a relationship may be shown in Equation 1:

$$\eta_1/\eta_2 \approx \phi_1/\phi_2 \quad (1)$$

where $\eta_1$ may be the melt viscosity of the first polymer blend (which may include the PVOH polymer and the GEMA based polymer), $\eta_2$ may be the melt viscosity of the polymer configured to provide post melt flexibility to the final polymer blend, $\phi_1$ may be the volume fraction of the first polymer blend (which may include the PVOH polymer and the GEMA based polymer), and $\phi_2$ may be the volume fraction of the polymer configured to provide post melt flexibility to the final polymer blend. In some examples, with such ratios, the blend may produce a co-continuous phase structure upon melt processing such as, for example, extrusion.

The polymer blend or blends that may be formed as discussed herein may have a variety of uses and implementations. In general, the blends may be used as a melt processable blend for the production of any polymer based material, layer or device. In some examples, they may be used to make PVOH based membranes with a variety of characteristics, as is discussed in further detail below. In some examples, the blend or blends may be used in applications including, but not limited to, film production, textile sizing, architectural coating, paper coating, fibers, adhesives, oxygen barrier films, or the like. In general, the blends may provide melt processable polymer alloys that may provide materials that are sturdy, relatively pliable, and easily manipulated.

Figure 4:
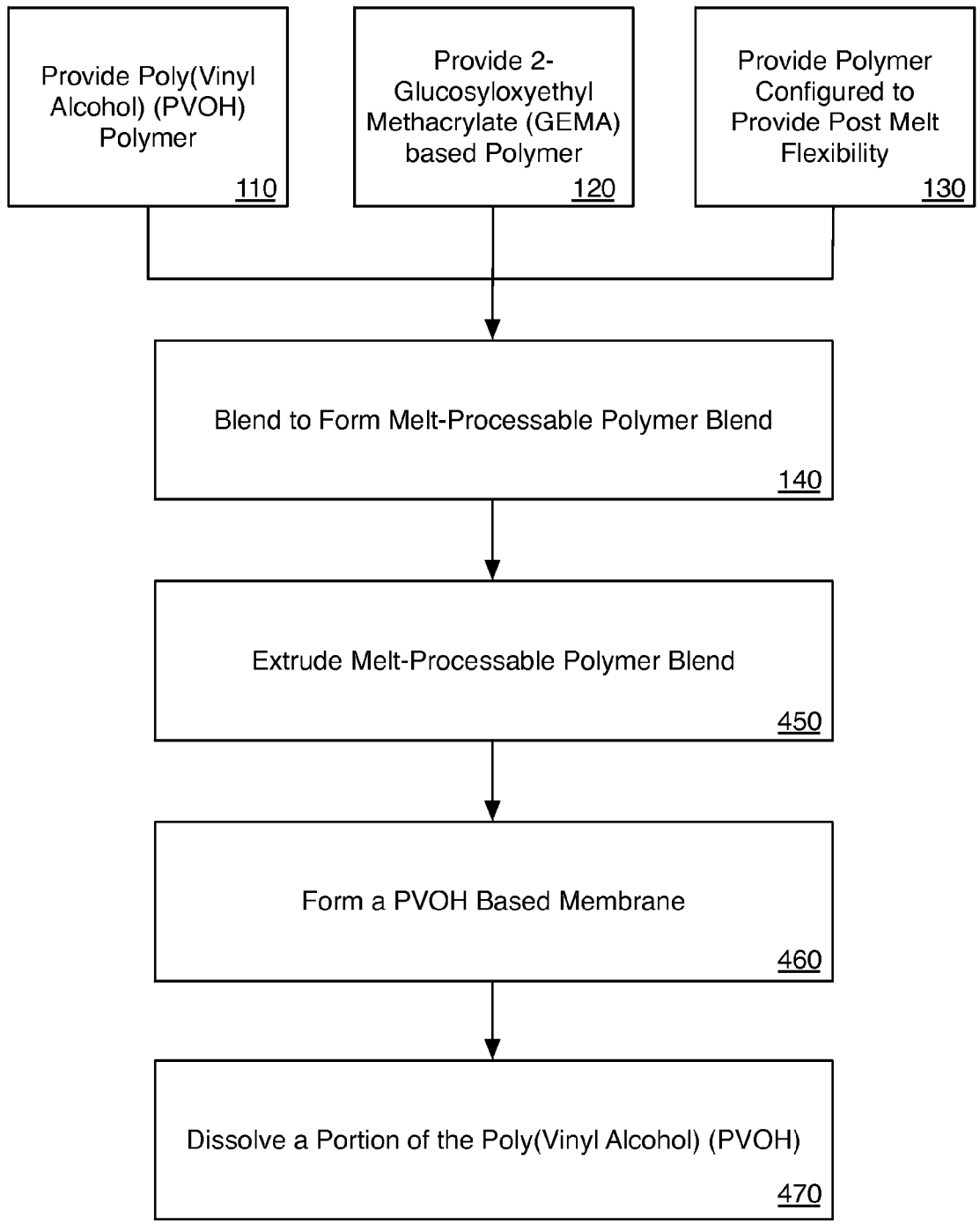
FIG. 4 is an illustration of a flow chart of an example method for producing a poly (vinyl alcohol) based membrane.

FIG. 4 is an illustration of a flow chart of an example method 400 for producing a poly(vinyl alcohol) based membrane arranged in accordance with at least some embodiments of the present disclosure. Method 400 may include one or more functions, operations or actions as illustrated by one or more of blocks 110, 120, 130, 140, 450, 460 and/or 470. In some examples, method 400 may be implemented under the control of a computer system, as is discussed further herein. Processing for method 400 may begin at blocks 110, 120 and/or 130.

Processing at blocks 110 ("Provide Poly(Vinyl Alcohol) (PVOH) Polymer"), 120 ("Provide 2-Glucosyloxyethyl Methacrylate (GEMA) based Polymer") and/or 130 ("Provide Polymer Configured to Provide Post Melt Flexibility") may include any of the example techniques and materials as discussed with respect to FIG. 1 and method 100. Processing may continue at block 140. Processing at block 140, "Blend to Form Melt-Processable Polymer Blend", may include any of the example techniques and materials as discussed with respect to FIG. 1 and method 100. Processing may continue at block 450.

At block 450, "Extrude Melt-Processable Polymer Blend", the melt processable polymer blend may be extruded. The extrusion may be performed according to any suitable polymer processing techniques to substantially melt the blend and/or to form an object having a substantially fixed cross-sectional profile. In some examples, the raw polymer blend may be fed into a barrel via a hopper and an operating screw may turn inside the barrel. Heat may be applied to the barrel causing the polymer blend to at least partially melt. The screw may further heat the polymer via friction. The at least partially molten polymer blend may be pushed through a breaker plate and/or die to form an extruded polymer. In some examples, the extrusion may form a sheet. In other examples, the extrusion may form a tubing. In general, the extrusion may form a polymer alloy of the PVOH, the GEMA based polymer and the polymer configured to provide post melt flexibility. Processing may continue at block 460.

At block 460, "Form a PVOH Based Membrane", the extruded melt-processable polymer may be formed into a membrane. The extruded polymer may be formed into a membrane using any suitable polymer processing technique or techniques. In some examples, the membrane may be formed by film blowing such that a substantially molten polymer sheet may be pulled into a die, and as the polymer cools, compressed air may form the polymer into a desired shape. In some examples, the membrane may be formed by casting such that substantially liquid polymer may be poured into a mold and cooled. As discussed with respect to block 450, the raw polymer blend may be extruded prior to forming the membrane. In some examples, the extrusion and membrane formation may occur substantially sequentially such that after extrusion, the membrane may be formed. In some examples, such a process may be termed injection molding or may use injection molding equipment. Processing may continue at block 470.

At block 470, "Dissolve a Portion of the Poly(Vinyl Alcohol) (PVOH)", at least a portion of the PVOH may be removed by dissolving. In some examples, the PVOH may be removed by dissolving or leaching with water as a solvent. In some examples, by dissolving or leaching with water, substantially small channels or pores (i.e., channels or pores having substantially small diameters) may be formed in the membrane. The channels may allow small particles or molecules through while not allowing larger particles or molecules through. Therefore, the membrane may be a porous or microporous membrane that may be suitable for a variety of applications. In some examples, the membranes may be used in applications such as filtration, water filtration, water purification, reverse osmosis, desalination, oxygen barrier films, or the like.

As discussed, the channels formed by dissolution with water may have substantially small diameters. In some examples, the channels may have diameters less than about 2 nm. In some examples, the channels may have diameters in the range of about 2 to 50 nm. In some examples, the channels may have diameters in the range of about 50 to 100 nm. The channel size may be varied by controlling a variety of materials and processing parameters such as, but not limited to, the choice of polymer configured to provide post melt processing flexibility to the polymer blend, the ratios of PVOH polymer, GEMA based polymer and polymer configured to provide post melt flexibility, processing temperature, the duration of exposure to solvent, or the like. In some examples, materials and processing parameters may be selected such that Equation (1) is substantially satisfied. Such parameters may provide substantial ease of use with melt polymer processing techniques.

Figure 5:
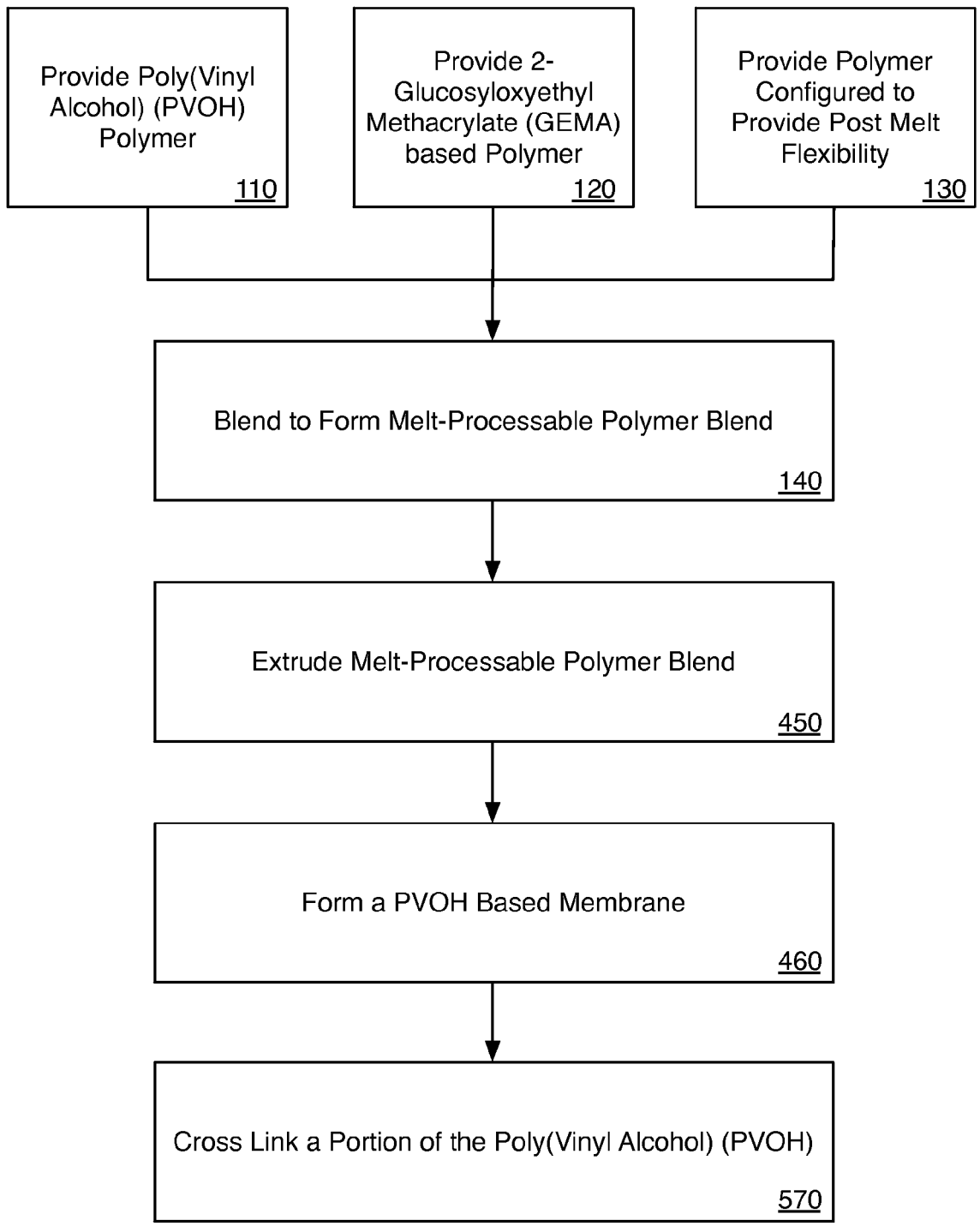
FIG. 5 is an illustration of a flow chart of another example method for producing a poly(vinyl alcohol) based membrane.

FIG. 5 is an illustration of a flow chart of another example method 500 for producing a poly(vinyl alcohol) based membrane arranged in accordance with at least some embodiments of the present disclosure. Method 500 may include one or more functions, operations or actions as illustrated by one or more of blocks 110, 120, 130, 140, 450, 460 and/or 570. In some examples, method 500 may be implemented under the control of a computer system, as is discussed further herein. Processing for method 500 may begin at blocks 110, 120 and/or 130.

Processing at blocks 110 ("Provide Poly(Vinyl Alcohol) (PVOH) Polymer"), 120 ("Provide 2-Glucosyloxyethyl Methacrylate (GEMA) based Polymer") and/or 130 ("Provide Polymer Configured to Provide Post Melt Flexibility") may include any of the example techniques and materials as discussed with respect to FIG. 1 and method 100. Processing may continue at block 140. Processing at block 140, "Blend to Form Melt-Processable Polymer Blend", may include any of the example techniques and materials as discussed with respect to FIG. 1 and method 100. Processing may continue at block 450. Processing at block 450, "Extrude Melt-Processable Polymer Blend", may include any of the techniques and materials discussed with respect to FIG. 4 and method 400. Processing may continue at block 460. Processing at block 460, "Form a PVOH Based Membrane", may include any of the techniques and materials discussed with respect to FIG. 4 and method 400. Processing may continue at block 570.

At block 570, "Crosslink a Portion of the Poly(Vinyl Alcohol) (PVOH)", at least a portion of the PVOH may be crosslinked. The PVOH may be crosslinked by any suitable technique or techniques. In some examples, the PVOH may be crosslinked by providing radiation to the membrane. In some examples, the radiation may be gamma radiation. In some examples, the PVOH may be crosslinked by providing a chemical to the membrane. In some examples, the chemical may be one or more of boric acid, glutaraldehyde, amic acid, maleic acid or polyacrylic acid. In some examples, the chemical may be a divalent or polyvalent acid. In some examples, the PVOH may be crosslinked by applying a relatively small amount of reactive multifunctional components to contact the PVOH such that subsequent drying may crosslink at least a portion of the PVOH.

As shown in FIG. 5, in some examples, the PVOH may be crosslinked after the membrane is formed. In other examples, the PVOH may be crosslinked (by application of radiation or chemicals) in situ such that the crosslinking may be performed during the formation of the membrane. In some examples, in situ crosslinking may include adding small amounts of the active components discussed above during processing. In general, the crosslinking may set and immobilize the polymer configured to provide post melt flexibility and may make the membrane water resistant while retaining the membrane's water permeability and swelling ability.

The crosslinked membrane may have many applications. In some examples, the membrane may be suitable for at least one of ultrafiltration, nanofiltration, reverse osmosis, water filtration, water purification, reverse osmosis, desalination, oxygen barrier films, or the like.

As discussed with respect to FIGS. 4 and 5, various membranes may be formed using the materials and techniques discussed herein. In various examples, by manipulating the chemistry of the PVOH in the pre- or post-melt processing phase, smart materials or smart membranes may be formed, such that the smart material or membrane may have a property or properties that may be controllably changed by, for example, external stress, temperature, pH, electrical conditions or magnetic conditions. In some examples, the smart materials may be formed by providing a multifunctional material such as a polyacrylic acid or polymethacrylic acid or copolymers of either such that the embedded hydrogel may be pH responsive or sensitive. Such pH sensitive membranes may, for example, swell or collapse when the pH in a surrounding solution changes, and may have application, for example, in drug delivery systems.

In other examples, the membranes discussed herein may be provided a post-treatment with aminobutyraldehyde diethyl acetal and methacrylamidoacetaldehyde dimethyl acetal to produce an animated and/or photoactive PVOH. Such animated and/or photoactive membranes may have application, for example, in solar cells or solar panels, or the like.

The discussed membrane production methods may offer the advantage of being produced on a continuous or semi-continuous process basis that may be industrially scaled up to produce pliable films that are substantially easy to handle. In some examples, the membrane production may be low cost and may be energy efficient. The membranes may offer ease of assembly in final products such as, for example, water purification equipment, desalination equipment, reverse osmosis equipment, or the like.

Figure 6:
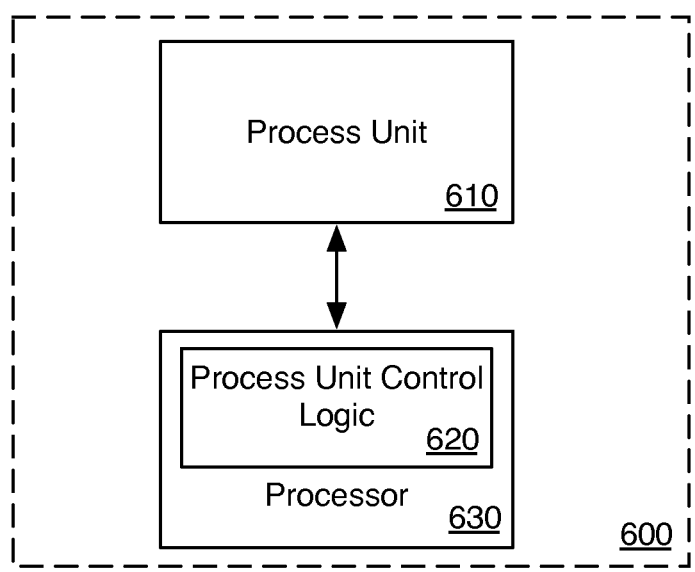
FIG. 6 is an illustration of an example system for producing melt-processable polymer blends or poly (vinyl alcohol) based membranes.

Turning now to other embodiments that may perform any of the methods as described herein, FIG. 6 illustrates an example system 600 for producing melt processable poly (vinyl alcohol) blends and poly(vinyl alcohol) based membranes arranged in accordance with at least some embodiments of the present disclosure. System 600 may be used to perform some or all of the functions described herein in connection with FIGS. 1 to 5. System 600 may include a process unit 610 operably coupled to a processor 630 that may include process unit control logic 620. Process unit 610 may include any or all of the characteristics as described herein. In various examples, process unit 610 may include an extruder (which may include, for example, a hopper, a feeder a barrel with a screw operating therein, a motor, a heating element and a die), a film blow die, a casting die, an injection molder, a dissolution bath, a radiation element, or the like. The process unit may also include electro-mechanical devices that may be configured to actuate the various components. In some examples, the processing equipment may be automatically or robotically actuated.

In some examples, system 600 may include a processor 630. In some examples, processor 630 may be implemented as part of a computer system. System 600 may include process unit control logic 620 that may be configured to undertake various methods, functional operations, actions, or blocks such as those described previously for FIGS. 1 to 5. Further, system 600 may include additional items such as memory, a router, network interface logic, etc. Process unit control logic 620 may be configured to provide any of the functionality described herein and claimed subject matter is not limited to specific types or manifestations of processing logic. For example, processor 630 may be a microprocessor or Central Processing Unit (CPU). In other implementations, processor 630 may be an Application Specific Integrated Circuit (ASIC), a Field Programmable Gate Array (FPGA), a digital signal processor (DSP), or other integrated formats. Processor 630 and process unit 610 may communicate by any suitable means, such as, for example, by wired connections or wireless connections.

FIG. 7 illustrates an example computer program product 700 arranged in accordance with at least some embodiments of the present disclosure. Computer program product 700 may include a signal bearing medium 702. Signal bearing medium 702 may include one or more machine-readable instructions 704, which, when executed by one or more processors, may operatively enable a computing device to provide the functionality described herein with respect to FIGS. 1 to 5. In various examples, some or all of the machine-readable instructions may be used by the devices discussed with respect to FIG. 6.

In some implementations, signal bearing medium 702 may encompass a computer-readable medium 707, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communication link, a wireless communication link, etc.).

Figure 8:
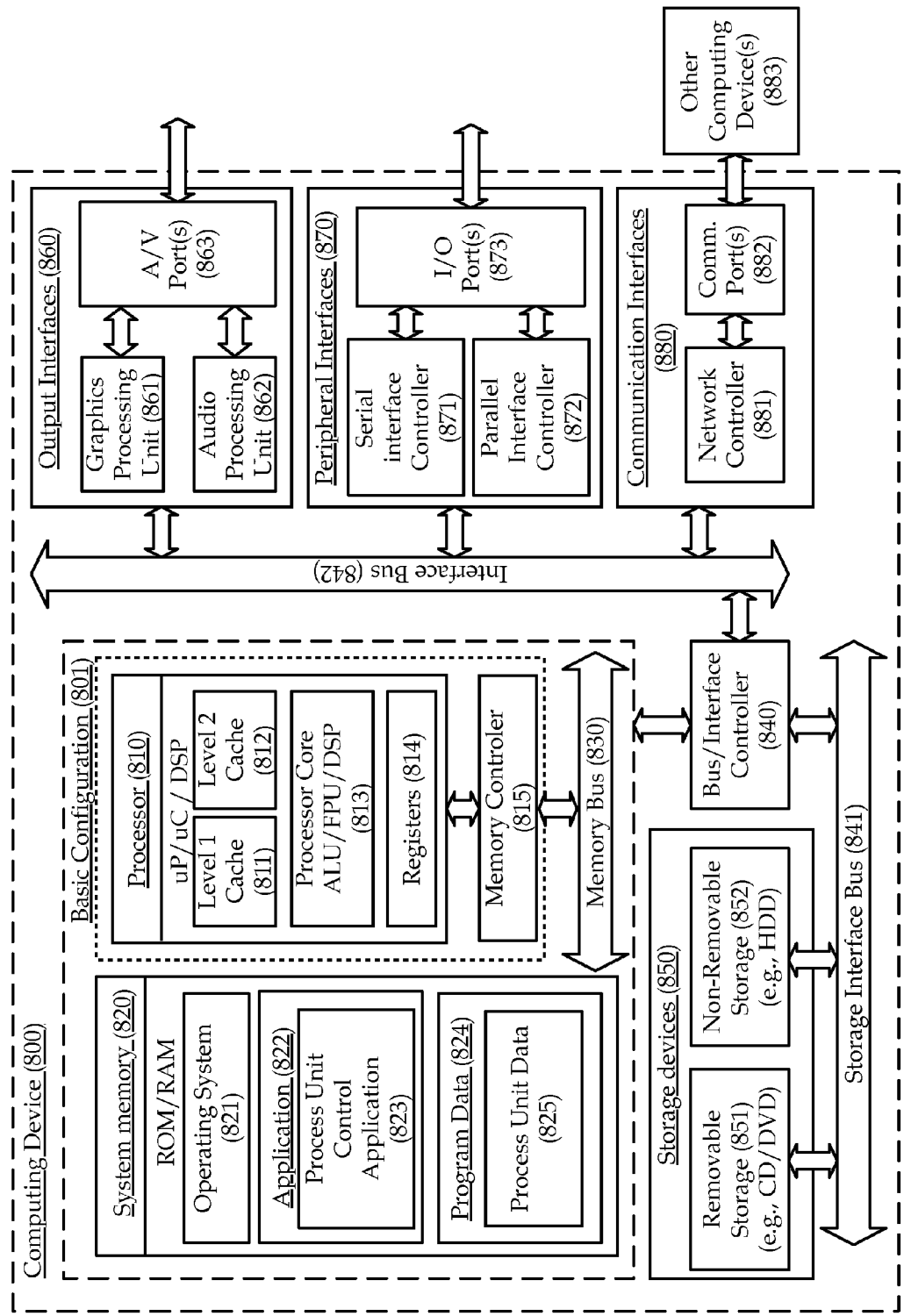
FIG. 8 is a block diagram illustrating an example computing device; all arranged in accordance with at least some embodiments of the present disclosure.

FIG. 8 is a block diagram illustrating an example computing device 800 arranged in accordance with at least some embodiments of the present disclosure. In various examples, computing device 800 may be configured to provide the operations discussed herein. In an example, the devices discussed with respect to FIG. 6 may be provided as a part of computing device 800. In one example basic configuration 801, computing device 800 may include one or more processors 810 and system memory 820. A memory bus 830 can be used for communicating between the processor 810 and the system memory 820.

Depending on the desired configuration, processor 810 may be of any type including but not limited to a microprocessor (µP), a microcontroller (µC), a digital signal processor (DSP), or any combination thereof. Processor 810 can include one or more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824. Application 822 may include process unit control application 823 that can be arranged to perform the functions, actions, and/or operations as described herein including the functional blocks, actions, and/or operations described with respect to FIGS. 1 to 6. Program Data 824 may include process unit data 825 for use with process unit control application 823. In some example embodiments, application 822 may be arranged to operate with program data 824 on an operating system 821. This described basic configuration is illustrated in FIG. 8 by those components within dashed line 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more data storage devices 850 via a storage interface bus 841. The data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may also include an interface bus 842 for facilitating communication from various interface devices (e.g., output interfaces, peripheral interfaces, and communication interfaces) to the basic configuration 801 via the bus/interface controller 840. Example output interfaces 860 may include a graphics processing unit 861 and an audio processing unit 862, which may be configured to communicate to various external devices such as a display or speakers via one or more A/V ports 863. Example peripheral interfaces 880 may include a serial interface controller 881 or a parallel interface controller 882, which may be configured to communicate with external devices such as input devices (e.g., keyboard, mouse, pen, voice input device, touch input device, etc.) or other peripheral devices (e.g., printer, scanner, etc.) via one or more I/O ports 883. An example communication interface 880 includes a network controller 881, which may be arranged to facilitate communications with one or more other computing devices 883 over a network communication via one or more communication ports 882. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 800 may also be implemented as a personal computer including both laptop computer and non-laptop computer configurations. In addition, computing device 800 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A melt-processable polymer blend comprising:
   a first polymer blend comprising a first polymer including poly(vinyl alcohol) and a second polymer including 2-glucosyloxyethyl methacrylate; and
   a third polymer selected to provide post melt processing flexibility to the polymer blend, wherein a melt viscosity ratio of the first polymer blend to the third polymer is selected to render the melt-processable polymer blend a co-continuous phase structure upon melt processing.

2. The melt-processable polymer blend of claim 1, wherein the third polymer comprises at least one of a poly(vinylidene fluoride) polymer, a polyolefin polymer, a nylon or a polyester.

3. The melt-processable polymer blend of claim 2, wherein the polyolefin polymer comprises at least one of a polyethylene polymer or a polypropylene polymer.

4. The melt-processable polymer blend of claim 1, wherein the second polymer comprises the 2-glucosyloxyethyl methacrylate incorporated in a linear acrylic polymer.

5. The melt-processable polymer blend of claim 1, wherein the second polymer comprises the 2-glucosyloxyethyl methacrylate incorporated in a core-shell acrylic polymer.

6. The melt-processable polymer blend of claim 1, wherein the melt viscosity ratio is a first melt viscosity of the first polymer blend to a second melt viscosity of the third polymer.

7. The melt-processable polymer blend of claim 6, wherein a volume ratio of the first polymer blend to the third polymer is a first volume fraction of the first polymer blend to a second volume fraction of the third polymer.

8. The melt-processable polymer blend of claim 7, wherein the volume ratio is substantially equal to the viscosity ratio.

* * * * *